United States Patent [19]

Kubo et al.

[11] Patent Number: 4,648,289
[45] Date of Patent: Mar. 10, 1987

[54] IDLING CONTROL SYSTEM FOR AN AUTOMATIC TRANSMISSION PROVIDING ANTI ROLL BACK ACTION

[75] Inventors: Seitoku Kubo; Yutaka Taga; Shinya Nakamura, all of Toyota, Japan

[73] Assignee: Toyota Jidosha Kabushiki Kaisha, Toyota, Japan

[21] Appl. No.: 769,324

[22] Filed: Aug. 26, 1985

[30] Foreign Application Priority Data

Aug. 24, 1984 [JP] Japan .................. 59-176300

[51] Int. Cl.$^4$ .................. B60K 41/18; B60K 41/16
[52] U.S. Cl. .................. 74/866; 74/867; 192/0.044; 192/0.055; 192/0.09
[58] Field of Search ............ 74/866, 867; 192/3 H, 192/0.044, 0.055, 0.09

[56] References Cited

U.S. PATENT DOCUMENTS

| | | | |
|---|---|---|---|
| 4,478,108 | 10/1984 | Nishimura et al. | 74/867 X |
| 4,495,576 | 1/1985 | Ito | 192/0.09 X |
| 4,513,639 | 4/1985 | Hiramatsu | 74/866 |
| 4,526,065 | 7/1985 | Rosen et al. | 74/867 X |
| 4,561,328 | 12/1985 | Hiramatsu | 74/867 X |

FOREIGN PATENT DOCUMENTS

| | | | |
|---|---|---|---|
| 0063046 | 5/1980 | Japan | 74/867 |
| 0187141 | 10/1984 | Japan | 74/867 |

*Primary Examiner*—Kenneth J. Dorner
*Assistant Examiner*—Dirk Wright
*Attorney, Agent, or Firm*—Oblon, Fisher, Spivak, McClelland & Maier

[57] ABSTRACT

An automatic transmission has a gear transmission mechanism with a forward clutch which is engaged when the gear transmission mechanism is engaged to a forward speed stage, a one way clutch which is in cooperation with the forward clutch provides a first speed stage by rotation prevention, and a brake which, when engaged, in cooperation with the one way clutch prevents the power output shaft of the gear transmission mechanism from rotating in the direction to allow reverse motion of the vehicle. An idling control system for the transmission includes a first mechanism for engaging the forward clutch selectively either to a maximum amount or to an intermediate amount substantially lower than the maximum amount; a second mechanism for engaging the brake, when the forward clutch is thus engaged to the intermediate amount by the first mechanism; and a third mechanism for, when the automatic transmission is being operated in a forward driving mode, the vehicle is substantially stationary, and the engine is in substantially idling condition, actuating the first mechanism thus to engage the forward clutch to the intermediate amount and the second mechanism thus to engage the brake. Thereby, rolling of the vehicle backwards down a hill while waiting in the stopped condition with the engine idling is positively prevented, and starting off of the vehicle is also facilitated.

6 Claims, 4 Drawing Figures

4,648,289

IDLING CONTROL SYSTEM FOR AN AUTOMATIC TRANSMISSION PROVIDING ANTI ROLL BACK ACTION

The present invention relates to an idling control system for an automatic transmission, and more particularly relates to such an idling control system for an automatic transmission which provides improved anti creep characteristics for keeping the vehicle at rest and for starting off the vehicle from rest and particularly has an anti roll back action.

There is a conventional type of automatic transmission for a vehicle which comprises a fluid torque converter which receives output of rotational power from an internal combustion engine and which transmits said power with a certain degree of torque amplification and with a certain degree of slippage to a gear transmission mechanism which can selectively provide any one of a plurality of forward speed stages (gearing ratios) between its power input shaft thus connected to said torque converter and its power output shaft connected to the driven road wheels of the vehicle so as to transmit rotational power thereto. Such a torque converter provides an amount of torque amplification and an amount of slippage both of which vary as the revolution speed of the input member (or pump impeller) of said torque converter varies, according to determinate performance characteristics thereof. And the gear transmission mechanism, which typically comprises a plurality of selectively engagable gear trains, is set in a determinate way to one or the other of said plurality of forward speed stages, according to the current values of various operational parameters of the internal combustion engine and of the vehicle incorporating it, said operational parameters including but not being limited to engine load (usually taken as being represented by throttle opening amount), vehicle road speed, and the one of various speed ranges such as "D" or drive range, "S" or second range and "L" or low range currently selected on a manually controlled range selection means provided to the vehicle. And the manner in which said plurality of forward speed stages is thus selected between according to the current values of said engine operational parameters is conventionally described by one or more shift diagrams.

When the abovementioned manual range setting means is set to "D" or drive range and the vehicle speed is substantially zero, i.e. the vehicle is substantially at rest, and further the internal combustion engine is substantially idling: then, in view of the desirability of maintaining a capability for relatively rapid starting off of the vehicle from this stopped condition, it is usually practiced not to put the gear transmission mechanism into a neutral condition in which it is incapable of transmitting rotational power between its power input shaft and its power output shaft, but instead typically said gear transmission mechanism is left as engaged to its first speed stage, i.e. its speed stage in which it provides a maximum reduction gearing ratio between its power input shaft and its power output shaft. Thereby a rapid response is available when the accelerator pedal of the vehicle is pressed in order to move off from rest, and the transmission is maintained in a state ready to transmit rotational power from the engine to the wheels of the vehicle, with the torque converter providing relatively great slippage and transmitting a relatively small amount of torque at this time due to the relatively low rotational speed of its power input member which is being driven by the internal combustion engine which is idling. When the accelerator pedal is in fact thus depressed by the foot of the vehicle driver, the revolution speed of the power output member of the engine (typically its crankshaft) rises, and accordingly the rotational speed of the power input member of the torque converter rises, and thereby the torque converter is caused to transmit substantially more torque, i.e. to provide less slippage between its power input member and its power output member. This increased torque is immediately transmitted by the gear transmission mechanism, since it is being maintained as engaged to its first speed stage as explained above, to the driven road wheels of the vehicle; and thereby the vehicle is caused to move off from the resting state.

This leaving of the gear transmission mechanism engaged to its first speed stage during the engine idling vehicle stopped condition produces the consequence of still transmitting some substantial amount of torque from the torque converter through said gear transmission mechanism to the driven road wheels of the vehicle at this time. This produces so called creep of the vehicle, and can indirectly lead to engine idling vibration. Further, it becomes necessary for the driver of the vehicle to press relatively hard on the brakes of the vehicle while the vehicle is thus stopped, as for example at a traffic light or the like, in order positively to prevent forward motion of the vehicle. And the drag of the torque converter on the internal combustion engine causes the fuel economy of the engine to be bad, and furthermore the transmission fluid in said torque converter tends to become hot, which can in some cases lead to an overall overheating problem for the vehicle as a whole.

This type of gear transmission mechanism typically includes a clutch which is generally called a forward clutch which is engaged when and only when the gear transmission mechanism is engaged to one of its forward speed stages, i.e. is providing forward driving for the vehicle. This forward clutch typically comprises two sets of friction elements connected to the two members which it selectiveky engages together, and is typically actuated by said two sets of friction elements being pressed together by a hydraulic servo device which has a pressure chamber for its actuation. Thus, the forward clutch is engaged when hydraulic fluid pressure is supplied to said pressure chamber of said hydraulic servo device thereof, with the engagement pressure between said sets of friction elements of said clutch and accordingly its torque transmission capability increasing the greater is the pressure value of said hydraulic fluid pressure. Accordingly, the assignee of the present patent application, who is also the applicant of the Japanese patent application of which the priority is being claimed for the present patent application, has proposed—in Japanese Patent Applications Serial Nos. 41-18128 (1966), 56-117742 (1981), 57-10444 (1982), 57-75829 (1982), and 57-115087 (1982), which have been respectively published as Japanese Patent Laying Open Publications Serial Nos. 47-19962 (1972), 58-21047 (1983), 58-128552 (1983), 58-193953 (1983), and 59-6454 (1984), and none of which it is intended hereby to admit as prior art to the present patent application except to the extent otherwise required by law—that, in the above described condition when the engine of the vehicle is substantially in the idling condition and the vehicle speed is substantially zero, the pressure, which is thus being supplied as an actuating pressure to a frictional engaging device of the gear transmission mechanism which is of the so called forward clutch type which is engaged when and only when the gear transmission mechanism is engaged to one of its forward speed stages, should be substantially decreased. Doing this allows said forward clutch to slip somewhat during this engine idling vehicle stopped operational condition, so that the gear transmission mechanism no longer transmits torque to any substantial extent while the vehicle is stopped. This means that substantially no vehicle creep takes place, and thus there is no requirement for the driver to press on the vehicle brake to maintain the vehicle in the stationary state. Further, the occurrence of idling vibration is made much less likely. The fuel economy of the vehicle is also improved. Also, since there is substantially no churning of the fluid in the torque converter, the problem of heating up of said torque converter is substantially overcome. The actuating pressure for the forward clutch can be quickly raised to an appropriate operational level when the accelerator pedal of the vehicle is depressed in order to start off the vehicle from rest, and so the provision of this anti creep device does not make the obtaining of a good response for starting off of the vehicle much more difficult.

However, the problem with this construction is that, since in the engine idling vehicle stopped condition the forward clutch is effectively disengaged, the vehicle can move in the reverse direction at this time, and this means that, if the vehicle has been stopped on an upwardly sloping gradient or hill, the vehicle driver must constantly keep the brake pedal depressed in order to prevent the vehicle from rolling backwards, which is substantially troublesome. Further, when starting off from the rest condition on such a hill, the driver must coordinate releasing of the brake pedal with depression of the accelerator pedal, in order to ensure smooth starting off of the vehicle without rolling backwards, and this is quite difficult. Accordingly, some means for preventing rolling backwards of the vehicle has become desirable, in view of the operation of such an anti creep device as explained above.

SUMMARY OF THE INVENTION

Accordingly, it is the primary object of the present invention to provide an idling control system for such an automatic transmission with an anti creep system, which even on an upward slope can satisfactorily prevent the vehicle rolling backwards during the stationary engine idling operational condition.

It is a further object of the present invention to provide such an idling control system for an automatic transmission, which allows starting off of the vehicle on a hill to be easy.

It is a further object of the present invention to provide such an idling control system for an automatic transmission, which does not require any particular coordination of the brake and throttle pedals during vehicle starting off on a hill.

It is a further object of the present invention to provide such an idling control system for an automatic transmission, which is economical to manufacture.

It is a further object of the present invention to provide such an idling control system for an automatic transmission, which is compact and of restricted size.

It is a further object of the present invention to provide such an idling control system for an automatic transmission, which does not require any special or dedicated transmission locking device.

It is a further object of the present invention to provide such an idling control system for an automatic transmission, which provides a good anti creep action.

It is a further object of the present invention to provide such an idling control system for an automatic transmission, which ensures that no particularly hard brake application by the vehicle driver, during the vehicle stationary engine idling condition, whether on a hill or not, is required in order to prevent the vehicle from moving.

It is a further object of the present invention to provide such an idling control system for an automatic transmission, which keeps fuel economy high.

It is a further object of the present invention to provide such an idling control system for an automatic transmission, which helps to prevent overheating.

It is a further object of the present invention to provide such an idling control system for an automatic transmission, which helps to prevent idling vibration.

According to the present invention these and other objects are accomplished by an idling control system for an automatic transmission system for a vehicle equipped with an engine, said automatic transmission system comprising a gear transmission mechanism which comprises: a power output shaft, a forward clutch which is engaged when said gear transmission mechanism is engaged to a forward speed stage, a one way clutch which in cooperation with said forward clutch provides a first speed stage by means of rotation prevention, and a brake which, when engaged, in cooperation with said one way clutch prevents said power output shaft of said gear transmission mechanism from rotating in the direction to allow reverse motion of said vehicle, comprising: a first means for engaging said forward clutch selectively either to a maximum amount or to an intermediate amount substantially lower than said maximum amount; a second means for engaging said brake, when said forward clutch is thus engaged to said intermediate amount by said first means; and a third means for, when said automatic transmission is being operated in a forward driving mode, said vehicle is substantially stationary, and said engine is in substantially idling condition, actuating said first means to engage said forward clutch to said intermediate amount and said second means to engage said brake.

According to such a structure, when the vehicle comes to rest with the engine idling in a forward driving mode (optionally, the additional condition that the vehicle braking system is being applied may be required), then said first means is controlled by said third means to engage said forward clutch to said intermediate amount and said second means to engage said brake, and accordingly torque is not substantially transmitted through said forward clutch to drive the vehicle forward, and thus no creeping of the vehicle can occur, and idling vibration is reduced. At this time, said brake is engaged, and therefore by its cooperation with said one way clutch the reverse motion of the vehicle is prevented. Accordingly, even on an upwardly facing hill, it is not necessary for the driver of the vehicle to press the brake pedal at all, and the vehicle cannot roll backwards. At this point the amount of engagement of the forward clutch could be substantially zero, but it is better to set said forward clutch to be just at the slipping point, so as to provide quick clutch engagement and quick starting off from rest. And, when any one of the above conditions (not however including said optional condition relating to application of the braking system) is no longer complied with, as for example when the accelerator pedal of the vehicle is pressed to increase engine load, then the engagement of the brake is released, and substantially simultaneously the forward clutch is engaged to a much greater amount, so as to cause the vehicle to move off from rest. Thereby, the anti roll back effect provided by the application of the brake is smoothly and simply released, and no particular coordination of operation of the brake and throttle pedals during vehicle starting off on a hill is required. Further, the brake which is used for providing this anti roll back effect is typically a shift brake which is used for providing one of the speed stages (other than the first speed stage) of the transmission. Accordingly, no special or dedicated transmission brake is required only for anti roll back control, and thus this idling control system is economical to manufacture, and is compact and of restricted size and weight. Thus, a good anti creep action is provided, along with good vehicle response when starting off from a condition of vehicle rest with the engine of the vehicle idling, and it is ensured that no particularly hard brake application by the vehicle driver, during the vehicle stationary engine idling condition, is required in order to prevent the vehicle from moving backward.

BRIEF DESCRIPTION OF THE DRAWINGS

The present invention will now be described with respect to several preferred embodiments of the method and the apparatus aspects thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. In the figures, spatial terms are to be understood as referring only to the orientation on the drawing paper of the illustrations of the relevant parts, unless otherwise specified; like reference numerals, unless otherwise so specified, denote the same parts and gaps and spaces and so on in the collection of figures relating to one embodiment, and denote like parts and gaps and spaces and so on in figures relating to different embodiments; and:

DESCRIPTION OF THE PREFERRED EMBODIMENTS

Figure 1:
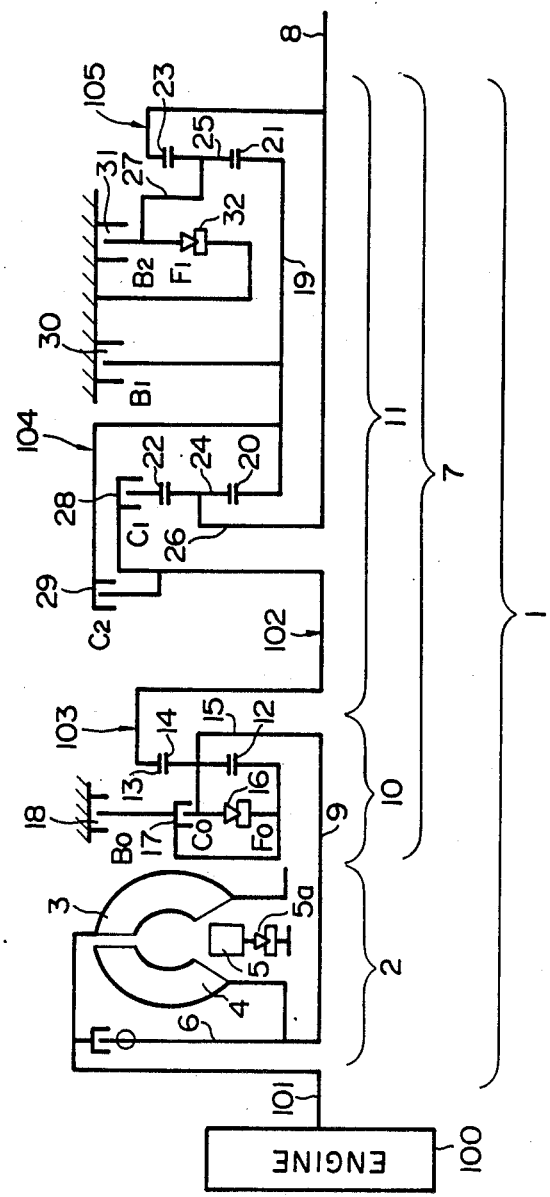
FIG. 1 is a schematic skeleton diagram showing the overall layout of the components of an automatic transmission to which both of the preferred embodiments of the idling control system of the present invention are applied.

The present invention will now be described with reference to the preferred embodiments thereof, and with reference to the figures. FIG. 1 is a schematic skeleton diagram showing the overall layout of the components of an automatic transmission, denoted by the reference numeral 1, to which either of the preferred embodiments of the idling control system of the present invention can be applied. In this figure, the automatic transmission 1 is shown as being powered by an internal combustion engine 100 via a shaft 101, and as transmitting output rotational power to a shaft 8 which leads, although this is not particularly indicated in the figures, to a differential device for powering the driven wheels of the automotive vehicle to which this automatic transmission 1 and this internal combustion engine 100 are fitted.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween.

The fluid torque converter assembly 2 is of a per se conventional three element single stage type with a direct clutch, and comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known fashion, by circulation of transmission fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof, with a certain amount of slippage and also of torque amplification being provided therebetween, the amount of such slippage and torque amplification being determined by the rotational speed of the power input shaft 101 of the torque converter assembly 2 and also by the output load on its power output shaft 9. A lock up clutch 6 of a per se known sort is provided for, when optionally engaged by the supply of actuating hydraulic pressure thereto, directly connecting the power input shaft 101 to the power output shaft 9, thus bypassing the above described hydraulic connection for the torque converter assembly and eliminating said slippage and torque amplification provided thereby.

In further detail, the gear transmission mechanism 7 comprises an auxiliary gear transmission mechanism 10 and a main gear transmission mechanism 11. The auxiliary gear transmission mechanism 10 is supplied with rotational power via the aforementioned power output shaft 9 of the fluid torque converter mechanism 2, which thus functions as a power input shaft for said auxiliary gear transmission mechanism 10; and a shaft 102 functions as a power output shaft for said auxiliary gear transmission mechanism 10 and also as a power input shaft for the main gear transmission mechanism 11 and transmits rotational power therebetween.

First, the auxiliary gear transmission mechanism 10 will be explained. This mechanism 10 comprises a first planetary gear mechanism 103 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power input shaft 9 of the auxiliary gear transmission mechanism 10 to receive rotational power therefrom, and the ring gear 13 is rotationally connected to the power output shaft 102 thereof so as to transmit rotational power thereto. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotation therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 10 with respect to mutual rotation therebetween in both rotational directions. The clutch C0 and the brake B0 are per se conventional types of friction engaging mechanism comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 10 can be controlled to provide either of two gearing ratios or rotational speed stages between its power input shaft 9 and its power output shaft 102, in a manner which will be clear to one of ordinary skill in the relevant art based upon the above explanations.

Next, the main gear transmission mechanism 11 will be explained. This mechanism 11 comprises second and third planetary gear mechanisms 104 and 105 which are arranged on the outside of a hollow intermediate shaft 19 which is coaxially fitted over the aforementioned power output shaft 8 of this main gear transmission mechanism 11. The second planetary gear mechanism 104 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and perform planetary motion between said sun gear 20 and said ring gear 22 in a per se conventional manner. The sun gear 20 is fixed on the left end in the figure of the intermediate shaft 19, and the carrier 26 for the planetary pinions 24 is rotationally connected to the power output shaft 8 of this main gear transmission mechanism 11. A clutch C1 28 is provided for selectively, when operated as will be particularly described later by selective and appropriate supply of actuating hydraulic fluid pressure thereto, rotationally connecting the ring gear 22 to the power input shaft 102 of this main gear transmission mechanism 11 with respect to mutual rotation therebetween in both rotational directions. And a clutch C2 29 is provided for selectively, when operated by selective supply of actuating hydraulic fluid pressure thereto, rotationally connecting said power input shaft 102 of this main gear transmission mechanism 11 to the sun gear 20 and to the aforementioned intermediate shaft 19 with respect to mutual rotation therebetween in both rotational directions. The clutch C1, which as will be seen later functions as a forward clutch and is engaged when and only when the automatic transmission mechanism 1 as a whole is providing forward drive, is not particularly detailed with regard to its structure in FIG. 1, but as will be seen later either can be of a per se conventional type or can be of a type which, although per se novel, does not itself constitute a part of the present invention, being described and claimed in copending Patent Application Ser. No. 769,355 filed 8-26-85; in any case, this clutch C1 is engaged when hydraulic fluid pressure is supplied to its actuating pressure chamber (not particularly shown in FIG. 1), while it is disengaged when no hydraulic fluid pressure is supplied to its said pressure chamber. Further, the clutch C2, which functions as a direct clutch, is a per se conventional type of friction engaging mechanism comprising a per se conventional hydraulic actuator system, and like the clutches C0 and C1 is engaged when hydraulic fluid pressure is supplied to its pressure chamber (not particularly shown), while it is disengaged when no hydraulic fluid pressure is supplied to its said pressure chamber. The third planetary gear mechanism 105 comprises a sun gear 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 8 of this main gear transmission mechanism 11. A brake B1 30 is provided for selectively, when operated by selective supply of actuating hydraulic fluid pressure thereto, rotationally connecting the aforementioned intermediate shaft 19 to the casing of this main gear transmission mechanism 11 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 11 with respect to mutual rotation therebetween in both rotational directions. Also, a one way clutch F1 is provided for always rotationally connecting said carrier 27 for said planetary pinions 25 to said casing of this main gear transmission mechanism 11 with respect to mutual rotation therebetween in one rotational direction only. These brakes B1 and B2 again are per se conventional types of friction engaging mechanisms comprising per se conventional hydraulic actuator systems, and like the brake B0 are engaged when hydraulic fluid pressure is supplied to their pressure chambers (not particularly shown), while they are disengaged when no hydraulic fluid pressure is supplied to their said pressure chambers.

Thus, by selective engagement and disengagement of the clutches C1 and C2 and of the brakes B1 and B2, the main gear transmission mechanism 11 can be controlled to provide any one of three forward gearing ratios or rotational speed stages and one reverse gearing ratio or rotational speed stage between its power input shaft 102 and its power output shaft 8, in a manner which will be clear to one of ordinary skill in the relevant art based upon the above explanations. And, further, the gear transmission mechanism 7 as a whole, as a combination of the auxiliary gear transmission mechanism 10 and the main gear transmission mechanism 11 and by the combined operation thereof, according to selective engagement and disengagement of the clutches C0, C1, and C2 and of the brakes B0, B1, and B2, can be controlled to provide any one of five forward gearing ratios or rotational speed stages including an overdrive speed stage and one reverse gearing ratio or rotational speed stage between its power input shaft 9 and its power output shaft 8, as particularly detailed in the Table, which is for typographical convenience given at the end of the specification and before the Claims of the present patent application. In this Table, an "O" in a column relating to a hydraulic clutch or a hydraulic brake indicates that said hydraulic clutch or hydraulic brake is engaged, while an "X" relating to such a hydraulic clutch or a hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels of the vehicle via the automatic transmission system 1 and on the other hand is free wheeling or disengaged when said engine is not so driving said driven wheels of the vehicle, in other words indicates that said one way clutch is free wheeling in, and only in, the engine overrun condition; while an "F" relating to a one way clutch indicates that said one way clutch is free wheeling or disengaged. From this Table, it will be understood that, when the automatic transmission 1 is being operated in the drive or "D" range, all five of its forward speed stages including its overdrive speed stage are available to be utilized, according to vehicle operational conditions as will be explained later; but, however, when the automatic transmission 1 is being operated in the second or "S" range, no upshift from the third speed stage to the fourth or the fifth speed stage is ever performed, and only the first through the third speed stages are available to be utilized, and furthermore, when the automatic transmission 1 is being operated in the low or "L" range, no upshift from the second speed stage to the third, the fourth, or the fifth speed stage is ever performed, and only the first and the second speed stages are available to be utilized. And further it will be particularly noted from this Table that the hydraulic clutch C1 is engaged when, and only when, the gear transmission mechanism 7 is engaged to a forward speed stage (i.e., to the first, second, third, fourth, or fifth speed stage), and is otherwise disengaged. And further from this Table it will be noted that the brake B1 is, during forward running of the vehicle, engaged when and only when the third speed stage of the gear transmission mechanism 7 is being provided, in other words functions as a third speed brake.

In general, each of the various hydraulic clutches and brakes detailed above, i.e. the clutches C0, C1, and C2 and the brakes B0, B1, and B2, is selectively engaged and disengaged by its hydraulic actuator system, by selective supply of hydraulic fluid pressure thereto from a control system which is an embodiment of the present invention, according to the current values of various operational parameters of the vehicle to which this automatic transmission 1 is fitted, such as vehicle road speed, engine load, range set by the vehicle driver on a manual range setting valve, and so on. Further, when said manual range setting value is set by the driver to a forward driving range such as "D" range, "S" range, or "L" range, and then the driver releases the accelerator pedal of the vehicle so as to reduce throttle opening to substantially zero, then as the vehicle road speed drops the aforesaid control system shifts the gear transmission mechanism 7 down through its speed stages, and below a certain road speed said gear transmission mechanism 7 is set to its first speed stage, in any of the aforementioned forward driving ranges. The idling control system according to the present invention is characterized by operating so that, when the transmission is set to a forward driving range, the vehicle is substantially stationary and the engine thereof is in the idling condition, the engagement pressure for the forward clutch C1 is reduced so that said forward clutch slips somewhat, and the third speed brake 30 is engaged. The various embodiments of the idling control system of the present invention are all of the hybrid hydraulic/electronic type incorporating a microprocessor, and in FIG. 2 a schematic block diagram of relevant parts of the first preferred embodiment of said control system is shown; this figure also shows a partial axial sectional view through a relevant version of the aforesaid forward clutch C1 of the gear transmission mechanism 7 to which this first preferred embodiment is provided.

Figure 2:
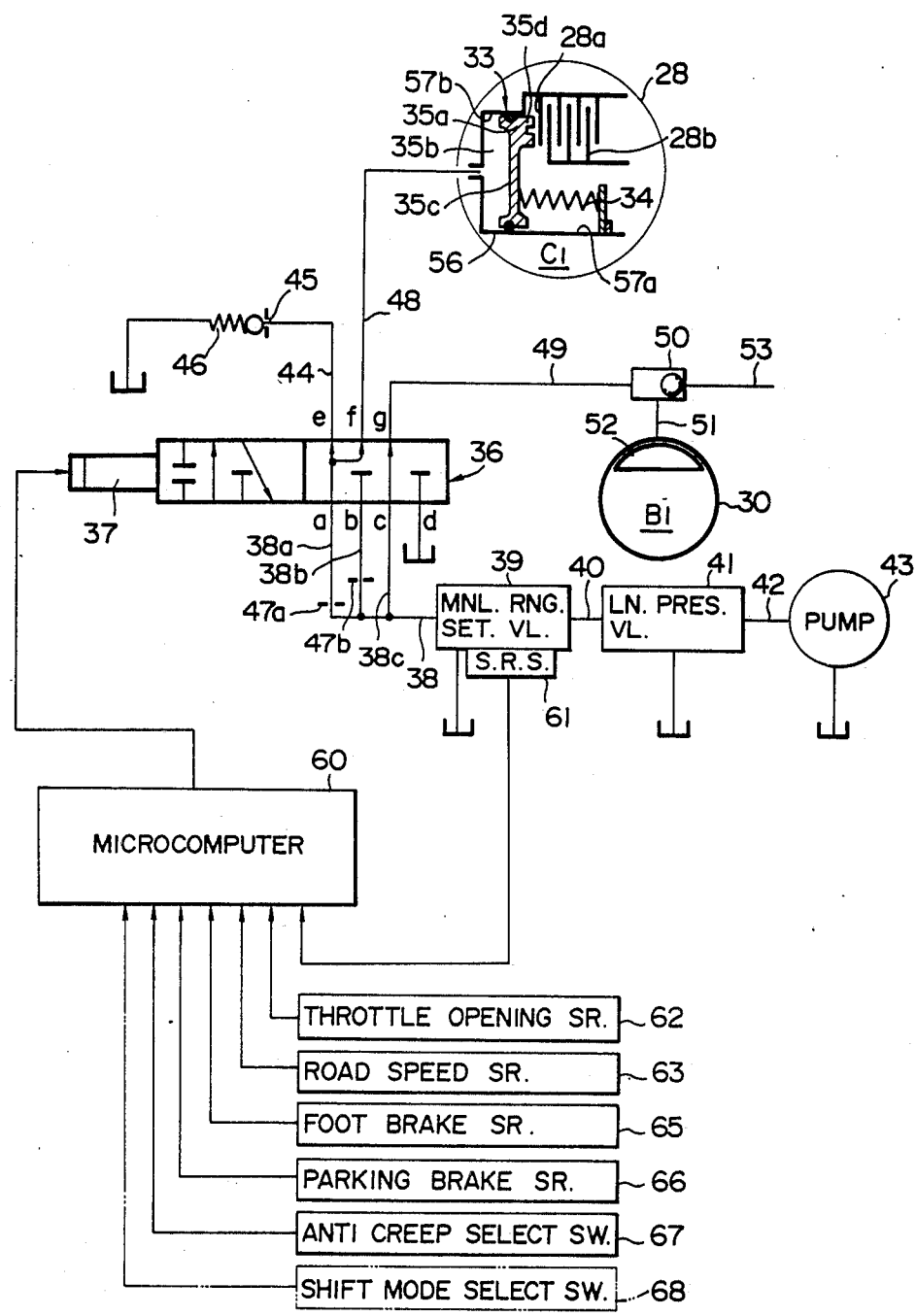
FIG. 2 is a schematic block diagram showing relevant parts of the first preferred embodiment of the idling control system of the present invention, as applied to a first variant of the FIG. 1 transmission, and also shows a partial longitudinal sectional view through a forward clutch of said transmission.

In detail, the forward clutch C1 of the gear transmission mechanism 7 to which this first preferred embodiment is provided is per se conventional, having two sets 28a and 28b of annular clutch plates which are alternately superposed in a sandwiched arrangement, i.e. are mutually interleaved, and the outer peripheries of the one set 28a of these clutch plates are rotationally secured to one of the shaft 102 and the ring gear 22 which this forward hydraulic clutch 28 selectively rotationally couples together (see FIG. 1), while the inner peripheries of the outer set 28b of these clutch plates are secured to the other one of said shaft 102 and said ring gear 22. The hydraulic actuator system 33 for this forward clutch C1 comprises an annular piston member 35a which can slide to and fro in the left and right directions as seen in FIG. 2 in an annular cylindrical bore which has an inner cylindrical bore 57a and an outer cylindrical bore 57b and which is defined in a member 56 rotationally coupled to (and typically integrally formed with) one of the shaft 102 and the ring gear 22. It should be understood that only a partial sectional view showing one side of the clutch plates 28a and 28b, the piston member 35a, the bores 57a and 57b, and so on is shown in FIG. 2, and in fact the forward clutch C1 and its actuator system are generally annular and circularly symmetric.

The annular piston member 35a, in more detail, is generally formed as a flat annnulus and extends between the inner cylindrical bore 57a and the outer cylindrical bore 57b and has an annular surface 35c defined on its left side in the figure, and the right hand (in the figure) annular end of a raised annulus 35d formed on its right side surface presses against the superposed sandwich of the sets of clutch plates 28a and 28b. Annular seal members are fitted between the outer periphery of the annular piston member 35a and the outer cylindrical bore 57b, and between the inner periphery of said annular piston member 35a and the inner cylindrical bore 57a, and thereby a pressure chamber 35b is defined on the left side in the figure of the piston member 35a, with the effective pressure receiving area within this pressure chamber 35b of the piston member 35a being the aforementioned area of the annular surface 35c. Further, an annular spring 34 is provided for biasing the annular piston member 35a in the leftwards direction in the figure, i.e. in the direction to release its pressing on the superposed sandwich of the clutch plates 28a and 28b and to reduce the volume of the pressure chamber 35b. Further, a conduit means 48 is provided for selectively supplying hydraulic fluid pressure to this pressure chamber 35b, or alternatively for selectively draining said chamber.

Accordingly, when no hydraulic fluid pressure is supplied to the pressure chamber 35b of this hydraulic actuator system 33, and this chamber 35b is instead drained, then by the biasing action of the annular spring 34 the piston member 35a is moved to the left in the figure, and thereby the superposed sandwich of the clutch plates 28a and 28b is not substantially compressed together at all, and the clutch plates 28a and the clutch plates 28b are not rotationally mutually substantially coupled together, and accordingly no substantial rotational torque can be transmitted from the shaft 102 to the ring gear 22 of the main gear transmission mechanism 11. Further, when hydraulic fluid pressure of a relatively low pressure level is supplied to the pressure chamber 35b of the hydraulic actuator system 33, then the action of this pressure urges the piston member 35a in the rightward direction in the figure with a relatively moderate force, against only the opposition of the annular biasing action of the spring 34 which is not very considerable in this context, and thereby the superposed sandwich of the clutch plates 28a and 28b is fairly moderately compressed together, and the clutch plates 28a and the clutch plates 28b are rotationally fairly moderately mutually coupled together, and accordingly rotational torque can be transmitted from the shaft 102 to the ring gear 22 of the main gear transmission mechanism 11 with a fairly moderate coupling action; in other words only a relatively moderate torque can be satisfactorily transmitted. On the other hand, when hydraulic fluid pressure of a relatively high pressure level is supplied to said pressure chamber 35b of said hydraulic actuator system 33, then the action of this pressure urges the piston member 35a in the rightward direction in the figure with a relatively strong force, and thereby the superposed sandwich of the clutch plates 28a and 28b is relatively strongly compressed together, and the clutch plates 28a and the clutch plates 28b are rotationally relatively strongly mutually coupled together, and accordingly rotational torque can be transmitted from the shaft 102 to the ring gear 22 of the main gear transmission mechanism 11 with a relatively strong coupling action; in other words a relatively large torque can be satisfactorily transmitted.

Now the arrangements for supplying controlling hydraulic fluid pressures to the pressure chamber 35b of the hydraulic actuator system 33 for the clutch C1 28 and to the pressure chamber of the third speed brake B1 30 will be detailed. A hydraulic fluid pump 43 picks up hydraulic fluid from a sump (not shown in detail) and supplies it under pressure via a conduit 42 to a line pressure regulation valve 41, which selectively bleeds off some of said pressurized hydraulic fluid back to the sump so as to produce a line pressure at its output side which is regulated to a substantially constant value; so far, these elements described are per se conventional. This line pressure is supplied via a conduit 40 to the input port of a manual range setting valve 39, which also is per se conventional: this manual range setting valve 39 is of the type previously discussed, and comprises a valve element (not particularly shown) which is manually settable by the driver of the vehicle, via a linkage or the like, to any one of the aforementioned various speed ranges, i.e. "D" or drive range, "S" or second range, "L" or low range, "R" or reverse range, "N" or neutral range, and "P" or parking range. This manual range setting valve 39 has various output ports, which are connected in various combinations to its said input port so as to receive supply of line pressure therefrom when its valve element is positioned to its various positions corresponding to these various ranges; most of these output ports are not relevant to the present discussion, but one of them, which is communicated to said input port for said manual range setting valve 39 when and only when the driver of the vehicle has selected a forward driving range thereon, i.e. has selected "D" or drive range, "S" or second range, or "L" or low range, is communicated via a conduit 38 to the upstream ends of three conduits 38a, 38b, and 38c. The conduit 38a leads, via a throttling element 47a, to an input port designated as "a" of an idling control valve 36; the conduit 38b leads, via another throttling element 47b, to another input port designated as "b" of said idling control valve 36; and the conduit 38c leads directly to another input port designated as "c" of said idling control valve 36. This idling control valve 36 has output ports designated as "d" through "g". The output port "d" is connected to a drain; the output port "e" is connected, via a conduit 44 and via a relief valve 46 including a throttling element 45, to a drain; the output port "f" is connected via the conduit 48 to the pressure chamber 35b of the hydraulic actuator system 33, and the output port "g" is communicated via a conduit 49 to one input side of a ball check valve 50, the output side of which is communicated via a conduit 51 to the pressure chamber 52 of the brake B1. And the other input side of this ball check valve 50 is communicated, via a conduit 53, to another portion not shown in the figures of the control system for this transmission whose function it is to engage this third speed brake B1 by supply of hydraulic pressure through the conduit 53 when and only when the third speed stage is to be engaged, as shown in the Table. By the per se known function of the ball check valve 50, therefore, the brake B1 can either be engaged by this hydraulic pressure supplied through the conduit 53, or by hydraulic pressure supplied through the conduit 49 from the idling control valve 36.

This idling control valve 36 is an electromagnetic switching valve which comprises a valve element (not particularly shown) which is controlled by a solenoid device 37. When this solenoid 37 is supplied with actuating electrical energy (by a means which will be described shortly), then as schematically indicated in the figure it positions the aforementioned valve element to a position in which the input port "a" of the valve 36 is communicated to the output ports "e" and "f" thereof and the input port "c" is communicated to the output port "g", while the input port "b" and the output port "d" are isolated and are communicated to no other ports; while, on the other hand, as also schematically indicated in the figure, when the solenoid 37 is not supplied with actuating electrical energy, then it positions the aforementioned valve element to a position in which said input ports "a" and "c" and the output port "e" are isolated and are not communicated to any other ports, while the input port "b" is communicated to the output port "f", while the output port "g" is communicated to the output port "d" and is accordingly drained. Thus, assuming that the driver of the vehicle has positioned the manual range setting valve 39 to a forward driving range as explained above, so that supply of the line pressure is being provided from said valve 39 to the conduit 38 and therefrom to the conduits 38a, 38b, and 38c: if the solenoid 37 of the idling control valve 36 is being provided with actuating electrical energy, then a pressure lower than line pressure is provided via the conduit 38a and the throttling element 47a, the ports "a" and "f" which are communicated together, and the conduit 48 to the pressure chamber 35b of the hydraulic actuator system 33, said pressure being regulated by the relief pressure setting of the relief valve 46 and by the flow resistances of the throttling elements 47a and 45, and accordingly as explained above the forward clutch C1 is engaged relatively moderately, so as to be able to transmit only a relatively moderate torque between the shaft 102 and the ring gear 22 of the main gear transmission mechanism 11, i.e. the forward clutch 28 is brought to a condition just before substantial torque transmission so as to be ready for being substantially engaged; and also a supply of line pressure is provided, via the conduit 38c, the ports "c" and "g" which are communicated together, the conduit 49, the ball check valve 50, and the conduit 51 to the pressure chamber 52 of the brake B1, so as to engage said brake B1. On the other hand, when the solenoid 37 is not supplied with actuating electrical energy, then a supply of full line pressure is provided via the conduit 38b, the throttling element 47b, the ports "b" and "f" which are now communicated together, and the conduit 48 to said pressure chamber 35b of the hydraulic actuator system 33, and accordingly as explained above the forward clutch C1 is engaged very strongly, so as to be able to transmit a large torque between the shaft 102 and the ring gear 22 of the main gear transmission mechanism 11, with no substantial slippage; but no substantial pressure is supplied to the pressure chamber 52 of the brake B1, but instead said pressure chamber 52 is drained via the conduit 49 and the ports "g" and "d" of the idling control valve 36 which are now connected together (all this providing of course that no pressure is supplied via the conduit 63 to the valve 60 from other parts of the hydraulic pressure control system for the transmission, for engaging the third speed stage thereof).

The solenoid 37 is selectively supplied with actuating electrical energy from an electrical control device which in this preferred embodiment of the present invention incorporates a microcomputer 60. This microcomputer 60 in fact is in overall control of the automatic transmission, and controls the engagement and disengagement of all of the hydraulic clutches and brakes detailed above, but only its roles in engaging and disengaging the forward clutch C1 and the third speed brake B1 are relevant and will be discussed herein. The microcomputer 60 receives input signals from sensors including: a set range sensor 61, which is provided as appended to the manual range selection valve 39, and which produces an output signal representative of what speed range is currently set on said manual range selection valve 39; a throttle opening sensor 62, which senses the position of the throttle pedal (not particularly shown) of the internal combustion engine 100 of the vehicle and which produces an output signal representative thereof, which is taken as representative of engine load; a road speed sensor 63, which produces an output signal representative of vehicle road speed; a foot brake sensor 65, which produces an output signal representative of whether or not the foot brake of the vehicle is being depressed, i.e. of whether or not the main braking system of the vehicle is being actuated by the driver; a parking brake sensor 66, which produces an output signal representative of whether or not the parking brake of the vehicle is set or not; an anti creep select switch 67, which is manually controlled by the driver of the vehicle, and which he or she sets to one or another of its OFF or ON positions, respectively according as he or she desires to employ the anti creep operational mode of the transmission or not; and a shift mode select switch 68, which again is manually controlled by the driver of the vehicle, and which he or she sets to one or another of its positions according to his or her desire to employ power or economical shifting mode for the transmission. And the microcomputer 60 repeatedly executes a control program for setting the various clutches and brakes detailed above to be engaged or disengaged. The portion of said control program relating to the engagement and disengagement of the forward clutch C1 and of the third speed brake B1, as relating to anti creep control, will now be detailed, with reference to FIG. 3 which is a flow chart of said relevant portion. This portion of the program is performed at regular intervals, or once every time the crankshaft of the engine 100 rotates through a determinate angle.

First, in the step 100, a test is made as to whether or not a forward driving range, i.e. "D" or drive range, "S" or second range or "L" or low range, is selected on the manual range setting valve 39. The microcomputer 60 makes this decision based upon the output of the set range sensor 61. If the result of this test is NO, i.e. the range currently selected is not one in which forward vehicle motion is possible, then the flow of control passes next to the step 107; but if the result of this test is YES, so that forward driving is possible, then the flow of control passes next to the step 101.

Next, in this step 101, a test is made as to whether or not the throttle of the internal combustion engine 100 is fully closed, or not, i.e. as to whether or not engine load is currently substantially minimum. the microcomputer 60 makes this decision based upon the output of the throttle opening sensor 62. If the result of this test is NO, i.e. engine load is not currently minimum, then the flow of control again passes next to the step 107; but if the result of this test is YES, so that currently in fact engine load is minimum, then the flow of control passes next to the step 102.

Next, in this step 102, a test is made as to whether or not the vehicle speed is currently less than a predetermined small value, or not, i.e. as to whether or not the vehicle is currently substantially stopped. The microcomputer 60 makes this decision based upon the output of the road speed sensor 63. If the result of this test is NO, i.e. the vehicle is not currently substantially stopped, then the flow of control again passes next to the step 107; but if the result of this test is YES, so that currently in fact the vehicle is substantially stopped, then the flow of control passes next to the step 103.

Next, in this step 103, a test is made as to whether or not the anti creep select switch 67 is currently ON or OFF, i.e. as to whether the driver of the vehicle currently desires anti creep action, or not. If the result of this test is NO, i.e. if anti creep action is not currently desired, then the flow of control again passes next to the step 107; but if the result of this test is YES, so that currently in fact anti creep action is required, then the flow of control passes next to the step 104.

Next, in this step 104, a test is made as to whether or not at least one of the foot brake and the parking brake of the vehicle is currently being applied, or not, i.e. as to whether the driver of the vehicle currently is applying braking action, or not. The microcomputer 60 makes this decision based upon the output of the foot brake sensor 65 and upon the output of the parking brake sensor 66. If the result of this test is NO, i.e. if braking action is not currently being applied, then the flow of control passes next to exit from this program portion, without doing anything further; but if the result of this test is YES, so that currently in fact braking action is being performed, then the flow of control passes next to the step 105.

Now, in this step 105, a test is made as to whether the value of a flag F is currently unity, or not, i.e. as to whether the flag F is currently set, or not. If the flag F is currently set, then again the flow of control passes next to exit from this program portion, without doing anything further; but if the flag F is currently not set, then the flow of control passes next to the step 106.

In this step 106, the microcomputer 60 starts to supply the solenoid 37 of the idling control valve 36 with actuating electrical power, thus, as explained above, providing a pressure lower than line pressure via the conduit 38a and the throttling element 47a, the ports "a" and "f" which are communicated together, and the conduit 48 to the pressure chamber 35b of the hydraulic actuator system 33, said pressure being regulated by the relief pressure setting of the relief valve 46 which is communicated to said port "f" via the port "e" which is communicated thereto and via the conduit 44 and by the flow resistances of the throttling elements 47a and 45. Accordingly, the forward clutch C1 is caused to be engaged relatively moderately, so as to be able to transmit only a relatively moderate torque between the shaft 102 and the ring gear 22 of the main gear transmission mechanism 11. It is thus arranged that in this vehicle stationary idling condition with braking effect being applied the forward clutch C1 is slightly engaged, i.e. is allowed to slip but is kept ready for engagement in a state just before the substantial torque transmission state, as explained previously in this specification. Thus, no substantial torque is transmitted from the torque converter assembly 2 to the ring gear 22 of the main gear transmission mechanism 11, and accordingly the occurrence of creep is prevented, and idling vibration is reduced. Further, also at this time a supply of line pressure is provided, via the conduit 38c, the ports "c" and "g" of the valve 36 which are communicated together, the conduit 49, the ball check valve 50, and the conduit 51 to the pressure chamber 52 of the brake B1, so as to engage said brake B1. Thereby, the sun gear 21 and the shaft 19 are rotationally fixed with respect to the transmission casing, and the carrier 27 cannot rotate in the reverse direction (the direction to allow the vehicle to move backwards) because of the effect of the one way clutch F1 32, so the power output shaft 8 of the transmission mechanism as a whole cannot rotate in the reverse direction. Accordingly, it is not necessary to press the foot brake of the vehicle at all while in the vehicle stopped engine idling condition upon a hill, after once having come to rest upon said hill by using the foot brake or the parking brake of the vehicle (this is because the NO exit of the decision step 104 leads directly to the end of the FIG. 3 program fragment, rather than to the decision box 107), and uphill starts are made easy. And next, in the operation of the FIG. 3 program, the value of the flag F is set to unity, so as to bypass this turning ON step 106 for the solenoid 37 on the next iteration through the FIG. 3 program fragment; and the flow of control passes next to exit from this program portion. Accordingly, providing that the transmission is engaged to a forward driving range, the engine is idling, the vehicle is substantially stationary, the shift mode switch 67 is selecting anti creep action, and braking was applied to the vehicle at some previous time during this condition, this step ensures that the forward cluth 28 is only engaged to a relatively moderate amount, according to the set value of the relief valve 46 and the flow resistances of the throttling elements 47a and 45 as explained above, so as to transmit a torque not actually sufficient to move the vehicle, but only sufficient to maintain the transmission in a state ready for starting off; and further the third speed brake B1 is engaged at this time, so as to prevent any reverse motion of the vehicle.

On the other hand, in the step 107, which as mentioned above is reached if any of the tests in the steps 100 through 103 produce a NO result, a test is made as to whether the value of the flag F is currently unity, or not, i.e. as to whether the flag F is currently set, or not. If the flag F is currently not set, then again the flow of control passes next to exit from this program portion, without doing anything further; but if the flag F is currently set, then the flow of control passes next to the step 108.

In this step 108, the microcomputer 60 stops supplying the solenoid 37 of the idling control valve 36 with actuating electrical power, so as now to start supplying a full value of line pressure as explained above via the conduit 38b and the throttling element 47b, via the ports "b" and "f" of the idling control valve 36, and via the conduit 48 to the pressure chamber 35b of the hydraulic actuator system 33, but so as now not to supply pressure to the pressure chamber 52 of the third speed brake B1, which instead is drained via the conduits 51 and 49, the ball check valve 50, and via the ports "g" and "d" of the idling control valve 36, and accordingly the forward clutch 28 is now caused to be engaged strongly, so as to be able to transmit a very large torque between the shaft 102 and the ring gear 22 of the main gear transmission mechanism 11, so that the vehicle can be moved off from rest; and also the third speed brake B1 is disengaged, so as to allow the transmission to operate properly in its first speed stage. Next, the value of the flag F is set to zero, so as to bypass this turning OFF step 108 for the solenoid 37 on the next iteration through the FIG. 3 program fragment; and the flow of control passes next to exit from this program portion. Accordingly, if after stopping by using the vehicle braking system, it becomes the case that either the transmission is not engaged to a forward driving range, or the engine is not idling, or the vehicle is not substantially stationary, or the shift mode switch 67 is not currently selecting anti creep action, this step ensures that the forward clutch 28 becomes engaged to a relatively large amount, so as to transmit a torque quite sufficient to move the vehicle; and also the locking up of the transmission with regard to reverse motion is released. Thus, normal operation of the transmission in a forward speed stage is assured.

Thus it is seen that, according to the shown first preferred embodiment of the present invention, with a forward speed range selected and anti creep action selected, when the vehicle is brought to a halt by using its brakes in the engine idling operational condition, then anti creep operation is provided, and further reverse motion of the vehicle is prevented. Even if subsequently to this stopping the vehicle braking system is released, still anti creep action and anti roll back action are continued to be provided, until (typically) the throttle pedal of the vehicle is depressed below the idling position. Thereby, slipping backwards on a hill while in the vehicle stopped condition is positively prevented, and easy hill starting is assured. And this anti roll back action is provided by using the third speed brake B1, and does not require the provision of any special or dedicated transmission brake; accordingly, cost is kept down, and the resulting device is rendered simple, compact, and not liable to breakdown. Further, since anti creep action in traffic is provided by the pressure chamber 35b of the forward clutch C1 being provided with an actuating pressure during the vehicle stopped condition which, while not zero, is substantially less than full line pressure, thereby, when the vehicle is to be started off from rest, a quick and crisp response is available.

On the other hand, when creeping action is actually required by the vehicle driver, as for example in traffic, then said driver sets the anti creep select switch 67 to its position for not providing anti creep action, and in this case even if the other conditions as detailed above are met no anti creep action or anti roll back action is provided, and the car creeps in a per se conventional manner.

Figure 3:
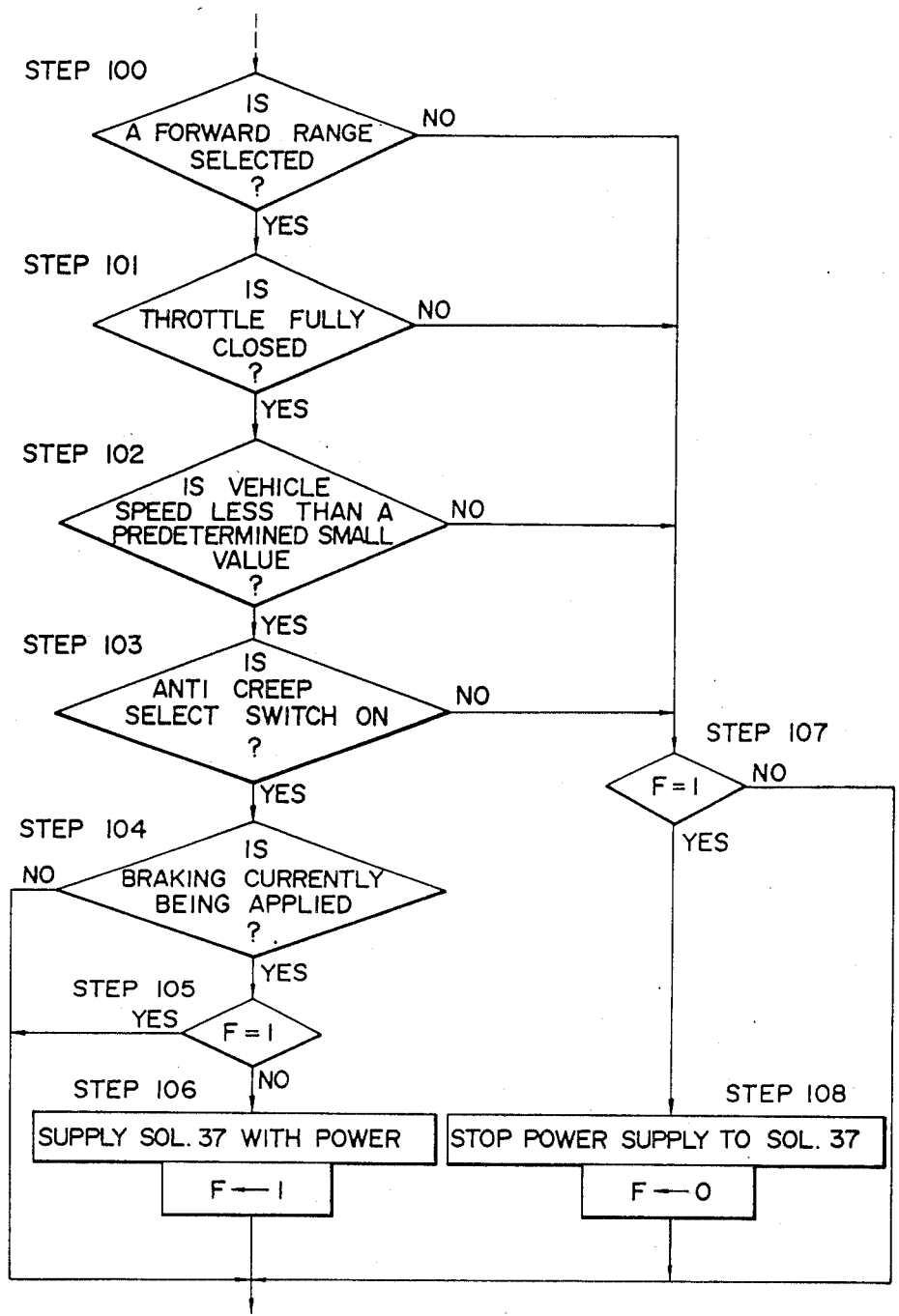
FIG. 3 is a flow chart for a portion of a program executed by a microprocessor incorporated in said first preferred embodiment of the idling control system of the present invention, said portion relating to anti creep idling control.

With regard to the operation of the shift mode select switch 68, another condition may be inserted in the FIG. 3 flow chart, to the effect that if an economy driving mode is set on said shift mode select switch 68, then anti creep action is provided for emphasizing vehicle fuel economy, while on the other hand if some other driving mode, such as a power driving mode, is selected then no anti creep action is provided.

Figure 4:
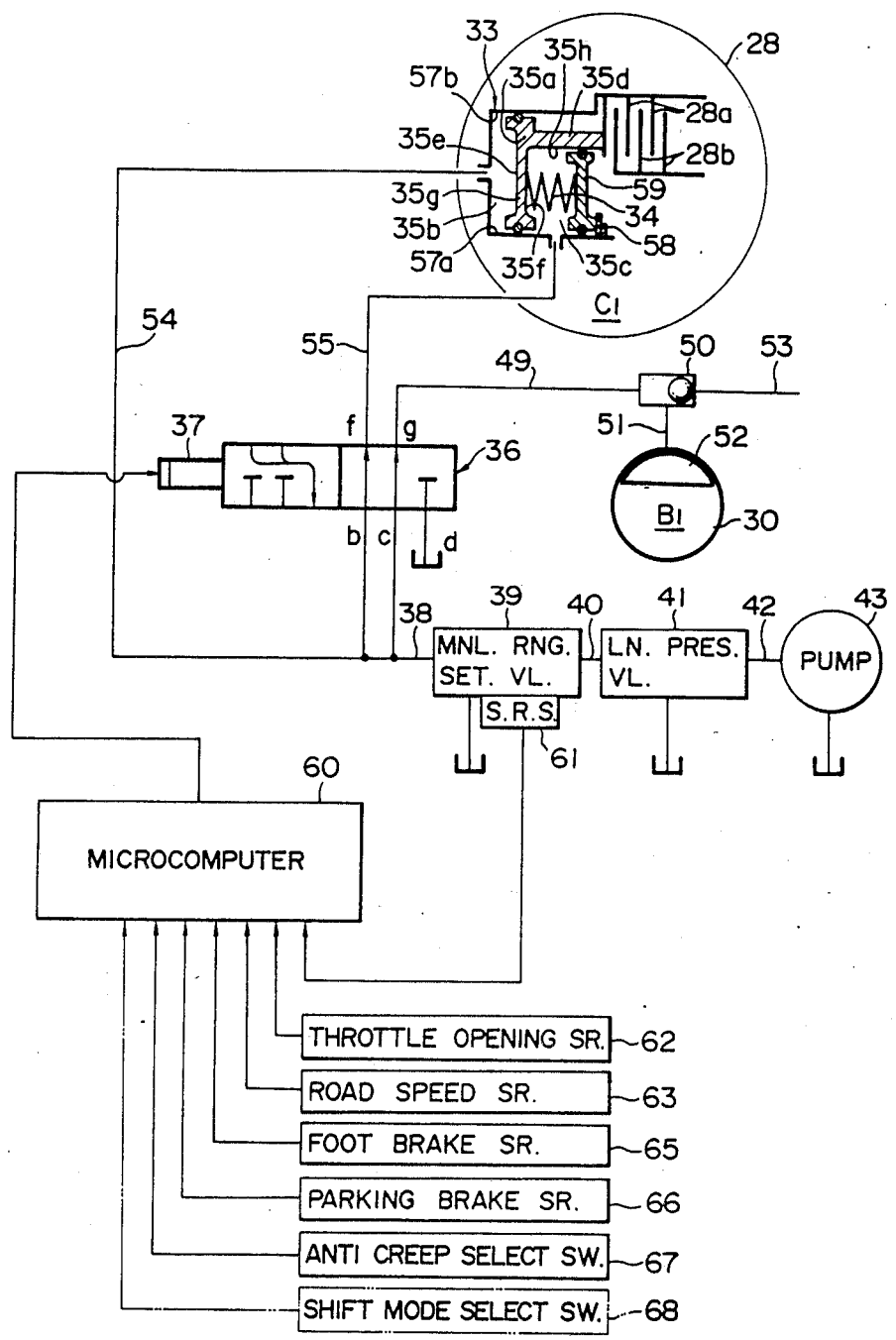
FIG. 4 is similar to FIG. 2, showing relevant parts of the second preferred embodiment of the idling control system of the present invention, as applied to a second variant of the FIG. 1 transmission, and also shows a partial longitudinal sectional view through a forward clutch of said transmission.

In FIG. 4, in a fashion similar to FIG. 2, there is presented a schematic block diagram showing the relevant parts of another control system for various hydraulic clutches and brakes of the FIG. 1 transmission, which is the second preferred embodiment of the present invention. Also there is shown a partial longitudinal sectional view through the forward clutch C1 28 of the transmission, which in this case incorporates an actuator system which is of a per se novel type which is shown and described in copending patent application Ser. No. 769,355 filed 8-26-85. In this FIG. 4, parts and chambers and surfaces which are similar to parts and chambers and surfaces relating to the first preferred embodiment shown in FIG. 2, and which have the same functions, are denoted by the same reference symbols as in that figure. The construction, and function of the forward clutch C1, which has a hydraulic actuator system 33 including two chambers 35b and 35c of differing effective pressure receiving areas, will now be described.

In detail, this forward clutch C1 has two sets 28a and 28b of annular clutch plates which are alternately superposed in a sandwiched arrangement, and as before the outer peripheries of the one set 28a of these clutch plates are rotationally secured to one of the shaft 102 and the ring gear 22, while the inner peripheries of the other set 28b of these clutch plates are secured to the other one of said shaft 102 and said ring gear 22. The hydraulic actuator system 33 for this forward clutch C1 comprises an annular piston member 35a which can slide to and fro in the left and right directions as seen in FIG. 4 in an annular cylindrical bore which has an inner cylindrical bore 57a and an outer cylindrical bore 57b and which is defined in a member 56 rotationally coupled to (and typically integrally formed with) one of the shaft 102 and the ring gear 22. It should be understood that only a partial sectional view showing one side of the clutch plate 28a and 28b, the piston member 35a, the bores 57a and 57b, and so on is shown in FIG. 4, and in fact the forward clutch C1 and its actuator system 33 are generally annular and circularly symmetric.

The annular piston member 35a, in more detail, is formed with a portion 35g which is generally formed as a flat annulus and extends between the inner cylindrical bore 57a and the outer cylindrical bore 57b and has a first annular surface 35e defined on its left side in the figure, and further said piston member 35a has a generally tubular portion 35d coaxially fitted to the other side from this annular surface 35e of said flat annular portion 35g and extending longitudinally outwards therefrom so that its right hand annular end in the figure presses against the superposed sandwich of the sets of clutch plates 28a and 28b. Thereby a second annular surface 35f, of substantially smaller total area than the above-mentioned first annular surface 35e, is defined to the radially inward side of the tubular portion 35d on the other side from the first annular surface 35e of the flat annular portion 35g, i.e. on the right hand side in the figure of said flat annular portion 35g. In other words, the area of the first annular surface 35e is determined by the difference between the radiuses of the inner cylindrical bore 57a and the outer cylindrical bore 57b, while on the other hand the area of the second annular surface 35f is determined by the difference between the radiuses of the inner cylindrical bore 57a and the inner cylindrical surface 35h of the tubular portion 35d and is accordingly substantially smaller than said area of the first annular surface 35e. Annular seal members are fitted between the outer periphery of the flat annular portion 35g and the outer cylindrical bore 57b, and between the inner periphery of said flat annular portion 35g and the inner cylindrical bore 57a, and thereby a first pressure chamber 35b is defined on the left side in the figure of the flat annular portion 35g of the piston member 35a, with the effective pressure receiving area within this first pressure chamber of the piston member 35a being the aforementioned area of the first annular surface 35e. Further, a sealing member 59 formed as a flat annulus is provided at the right end of the bore as extending between the inner cylindrical bore 57a (to which said sealing member 59 is held by a fixed ring member 58) and said inner cylindrical surface 35h of the tubular portion 35d, and annular seal members are fitted between the outer periphery of said flat annular sealing member 59 and said inner cylindrical surface 35h of the tubular portion 35d and between the inner periphery of said flat annular sealing member 59 and said inner cylindrical bore 57a, and thereby a second pressure chamber 35c is defined on the right side in the figure of the flat annular portion 35g of the piston member 35a, with the effective pressure receiving area within this second pressure chamber 35c of the piston member 35a being the aforementioned area of the second annular surface 35f. And an annular spring 34 is provided within this second pressure chamber 35c for biasing the annular piston member 35a in the leftwards direction in the figure, i.e. in the direction to release its pressing on the superposed sandwich of the clutch plates 28a and 28b and to reduce the volume of the first pressure chamber 35b while increasing the volume of the second pressure chamber 35c. Further, respective conduit means 54 and 55 are provided for selectively supplying hydraulic fluid pressure to these first and second pressure chambers 35b and 35c, or alternatively for selectively draining said chambers.

Accordingly, when no hydraulic fluid pressure is supplied either to the first pressure chamber 35b or the second pressure chamber 35c of this hydraulic actuator system 33, and both of these chambers 35b and 35c are drained, then by the biasing action of the annular spring 34 the piston member 35a is moved to the left in the figure, and thereby the superposed sandwich of the clutch plates 28a and 28b is not substantially compressed together at all, and the clutch plates 28a and the clutch plates 28b are not mutually substantially coupled together, and accordingly no substantial rotational torque can be transmitted from the shaft 102 to the ring gear 22 of the main gear transmission mechanism 11. The same result would occur in the case that hydraulic fluid pressure were supplied to the second pressure chamber 35c of the hydraulic actuator system 33 but not to its first pressure chamber 35b, and said first chamber 35b were instead drained. Further, when hydraulic fluid pressure is supplied to the first pressure chamber 35b of the hydraulic actuator system 33 but not to its second pressure chamber 35c, and said second chamber 35c is instead drained, then by the action of this pressure to enlarge the volume of this first pressure chamber 35b, against only the opposition of the annular biasing action of the spring 34 which is not very considerable, the piston member 35a is moved to the right in the figure, and thereby the superposed sandwich of the clutch plates 28a and 28b is very strongly compressed together, and the clutch plates 28a and the clutch plates 28b are strongly mutually coupled together, and accordingly rotational torque can be transmitted from the shaft 102 to the ring gear 22 of the main gear transmission mechanism 11 with a very strong coupling action; in other words a very large torque can be satisfactorily transmitted. On the other hand, when hydraulic fluid pressure is supplied to the first pressure chamber 35b of the hydraulic actuator system 33 and also a substantially equal hydraulic fluid pressure is supplied to its second pressure chamber 35c, then the action of the pressure in the first pressure chamber 35b to enlarge it urges the piston member 35a in the rightward direction in the figure, while the action of the pressure in the second pressure chamber 35c to enlarge it urges the piston member 35a in the leftward direction in the figure, with the aid of the biasing action of the annular spring 34 which however is so inconsiderable in this context as to be ignorable, and, because the area of the second annular surface 35f is substantially smaller than the area of the first annular surface 35e, thereby as an overall effect the piston member 35a is moved to the right in the figure with a force determined by the difference of said areas, and thereby the superposed sandwich of the clutch plates 28a and 28b is fairly moderately compressed together, and the clutch plates 28a and the clutch plates 28b are fairly moderately mutually coupled together, and accordingly rotational torque can be transmitted from the shaft 102 to the ring gear 22 of the main gear transmission mechanism 11 with a fairly moderate coupling action; in other words only a relatively moderate torque can be satisfactorily transmitted.

Now the arrangements for supplying controlling hydraulic fluid pressures to the first and second pressure chambers 35b and 35c of this hydraulic actuator system 33 will be detailed. The idling control valve 36 has an output port "f" connected via the conduit 55 to the second pressure chamber 35c of the hydraulic actuator system 33, another output port "d" which is drained, and an input port "b" which is communicated via the conduit 38 to an output port of the manual range setting valve 39 which as before is provided with supply of line pressure when and only when the driver of the vehicle has selected a forward driving range thereon; and further this output port of the manual range setting valve 39 is also communicated via the conduit 54 branched off from an intermediate point of said conduit 38 to the first pressure chamber 35b of the hydraulic actuator system 33 for the forward clutch 28. Further, the idling control valve 36 also has another input port "c" and another output port "g". The input port "c" is communicated to the same output port of the manual range setting valve 39 as the input port "b", and the output port "g", similarly to the construction in the first preferred embodiment of the present invention described above, is communicated via a conduit 49 to one input side of a ball check valve 50, the output side of which is communicated via a conduit 51 to the pressure chamber 52 of the third speed brake B1, while the other input side of this ball check valve 50 is communicated via a conduit 53 to another portion not shown in the figures of the control system for this transmission whose function it is to engage this third speed brake 30 by supply of hydraulic pressure through the conduit 53 when and only when the third speed stage is to be engaged.

As before, the idling control valve 36 has a valve element, not shown, the movement of which is controlled by a solenoid device 37. When this solenoid 37 is supplied with actuating electrical energy, then as schematically indicated in the figure it positions the aforementioned valve element to a position in which the input port "b" of the valve 36 is communicated to the output port "f" thereof, the input port "c" is communicated to the output port "g", and the drain output port "d" is communicated to no other port, while, on the other hand, as also schematically indicated in the figure, when the solenoid 37 is not supplied with actuating electrical energy, then it positions the aforementioned valve element to a position in which said input port "b" and said input port "c" are not communicated to any other ports, while the output port "f" and also the output port "g" are communicated to the output port "d" and are accordingly drained. Thus, assuming that the driver of the vehicle has positioned the manual range setting valve 39 to a forward driving range as explained above, so that supply of the line pressure is being provided from said valve 39 to the conduit 38 and therefrom to the conduit 54, the action of the system as far as supply of hydraulic pressure to the first and second chambers 35b and 35c of the hydraulic actuator system 33 for the forward clutch 28 is concerned is the following. If the solenoid 37 of the idling control valve 36 is being provided with actuating electrical energy, then line pressure is provided via the conduit 54 to the first pressure chamber 35b of the hydraulic actuator system 33 and also via the conduit 38, the ports "b" and "f" of the idling control valve 36, and the conduit 55 to the second pressure chamber 35c of said hydraulic actuator system 33, and accordingly as explained above the forward clutch C1 is engaged relatively moderately, so as to be able to transmit only a relatively moderate torque between the shaft 102 and the ring gear 22 of the main gear transmission mechanism 11, and thereby the forward clutch C1 is controlled to be just slipping and to be ready to transmit substantial torque quickly when engaged, i.e. is kept in an anti creep operational condition; and further, at this time, the third speed brake B1 is engaged by supply of line pressure via the conduit 38, the ports "c" and "g" of the idling control valve 36 which are communicated together, the conduit 49, the ball check valve 50, and the conduit 51 to the pressure chamber 52 of said brake B1, and accordingly as in the case of the first preferred embodiment described above the rear sun gear 21 and the intermediate shaft 19 are prevented from rotation with respect to the transmission casing, and, since the rear carrier 25 is prevented from rotating in the reverse rotational direction with respect to said transmission casing by the action of the one way clutch F1, thereby the power output shaft 8 of the transmission is prevented from turning in the reverse rotational direction, i.e. is prevented from rotating in the direction to allow the vehicle to move backwards. As before, this prevents the vehicle from running downhill in the backwards direction in the case when the vehicle is brought to rest facing up the slope of a hill, even though the transmission is not providing any forward creep at all at this time due to the operation of the anti creep system. On the other hand, when the solenoid 37 is not being supplied with actuating electrical energy, then as before line pressure is provided via the conduit 54 to the first pressure chamber 35b of the hydraulic actuator system 33, but no substantial pressure is supplied through the idling control valve 36 to the second pressure chamber 35c of said hydraulic actuator system 33, but instead said second pressure chamber 35c is drained via the conduit 55 and the ports "f" and "d" of said idling control valve 36, and accordingly as also explained above the forward clutch 28 is engaged very strongly, so as to be able to transmit a large torque between the shaft 102 and the ring gear 22 of said main gear transmission mechanism 11, for normal forward driving operation. Further, in this case, the third speed brake B1 is disengaged by its pressure chamber 52 being drained via the conduit 51, the ball check valve 50, the conduit 49, and the ports "g" and "d" of the idling control valve 36 which are communicated together, and accordingly no roll back prevention action is provided, as of course is appropriate during usual transmission operation for forward driving.

In this second preferred embodiment, the program obeyed by the microcomputer 60 is the same as in the case of the first preferred embodiments as detailed in FIG. 3.

Although the present invention has been described in terms of the preferred embodiments thereof detailed above, and with reference to the illustrative drawings, it should not be considered as limited thereby, since various alterations, omissions, and/or modifications to the details of the shown preferred embodiments could be made without departing from the scope of the present invention. Further, the details of the appended drawings are only to be taken as being exemplary, and not as being limiting, since in other possible embodiments these details could be departed from without straying from the scope of the present invention. Accordingly the scope of the present invention, and of the protection sought to be granted by Letters Patent, should be considered as defined, not by the perhaps purely fortuitous details of the shown preferred embodiments, or of the drawings, but solely by the legitimate and proper scope of the claims, which follow after the Table.

TABLE

|  | C1 (28) | C2 (29) | C0 (17) | B1 (30) | B2 (31) | B0 (18) | F1 (32) | F0 (16) |
|---|---|---|---|---|---|---|---|---|
| P RANGE | X | X | O | X | X | X | F | F |
| R RANGE | X | O | O | X | O | X | F | O |
| N RANGE | X | X | O | X | X | X | F | F |
| D RANGE |  |  |  |  |  |  |  |  |
| 1ST | O | X | O | X | X | X | O | O |
| 2ND | O | X | X | X | X | O | O | F |
| 3RD | O | X | O | O | X | X | F | O |
| 4TH | O | O | O | X | X | X | F | O |
| 5TH | O | O | X | X | X | O | F | F |
| S RANGE |  |  |  |  |  |  |  |  |
| 1ST | O | X | O | X | X | X | O | O |
| 2ND | O | X | X | X | O | O | O | F |
| 3RD | O | X | O | O | X | X | F | O |
| L RANGE |  |  |  |  |  |  |  |  |
| 1ST | O | X | O | X | O | X | O | O |
| 2ND | O | X | X | X | O | O | O | F |

What is claimed is:

1. An idling control system for an automatic transmission system for a vehicle equipped with an engine, said automatic transmission system comprising a gear transmission mechanism which comprises: a power output shaft, a forward clutch which is engaged when said gear transmission mechanism is engaged to a forward speed stage, a one way clutch which in cooperation with said forward clutch provides a first speed stage by means of rotation prevention, and a brake which, when engaged, in cooperation with said one way clutch prevents said power output shaft of said gear transmission mechanism from rotating in the direction to allow reverse motion of said vehicle, comprising:
   a first means for engaging said forward clutch selectively either to a maximum amount or to an intermediate amount substantially lower than said maximum amount;
   a second means for engaging said brake, when said forward clutch is thus engaged to said intermediate amount by said first means; and
   a third means for, when said automatic transmission is being operated in a forward driving mode, said vehicle is substantially stationary, and said engine is in substantially idling condition, actuating said first means to engage said forward clutch to said intermediate amount and said second means to engage said brake.

2. An idling control system for an automatic transmission system for a vehicle equipped with an engine and a braking system, said automatic transmission system comprising a gear transmission mechanism which comprises: a power output shaft, a forward clutch which is engaged when said gear transmission mechanism is engaged to a forward speed stage, a one way clutch which in cooperation with said forward clutch provides a first speed stage by means of rotation prevention, and a brake which, when engaged, in cooperation with said one way clutch prevents said power output shaft of said gear transmission mechanism from rotating in the direction to allow reverse motion of said vehicle, comprising:

a first means for engaging said forward clutch selectively either to a maximum amount or to an intermediate amount substantially lower than said maximum amount;

a second means for engaging said brake, when said forward clutch is thus engaged to said intermediate amount by said first means; and a third means for:

when said automatic transmission is being operated in a forward driving mode, said vehicle is substantially stationary, said engine is in substantially idling condition, and said braking system is applied, starting the actuation of said first means to engage said forward clutch to said intermediate amount and of said second means to engage said brake; and for:

thereafter, as long as said automatic transmission is being operated in a forward driving mode, said vehicle is substantially stationary, and said engine is in substantially idling condition, continuing the actuation of said first means to engage said forward clutch to said intermediate amount and of said second means to engage said brake, even if said application of said braking system is terminated; and for:

when thereafter either said automatic transmission ceases to be operated in a forward driving mode, or said vehicle ceases to be substantially stationary, or said engine ceases to be in substantially idling condition, starting the actuation of said first means to engage said forward clutch to said maximum amount and of said second means to disengage said brake.

3. An idling control system according to claim 1 or claim 2, said forward clutch comprising a hydraulic actuator which is driven in the direction to engage said forward clutch by supply of hydraulic pressure to a pressure chamber thereof; said first means thus selectively engaging said forward clutch to said maximum amount by supplying a maximum hydraulic pressure value to said pressure chamber and thus selectively engaging said forward clutch to said intermediate amount by supplying an intermediate hydraulic pressure value to said pressure chamber.

4. An idling control system according to claim 1 or claim 2, said forward clutch comprising a hydraulic actuator which is driven in the direction to engage said forward clutch by supply of hydraulic pressure to a first pressure chamber thereof and in the direction to disengage said forward clutch by supply of hydraulic pressure to a second pressure chamber thereof, the effective pressure receiving area in said first pressure chamber being substantially greater than the effective pressure receiving area in said second pressure chamber; said first means thus selectively engaging said forward clutch to said maximum amount by supplying a certain hydraulic pressure value to said first pressure chamber but substantially no hydraulic pressure to said second pressure chamber, and thus selectively engaging said forward clutch to said intermediate amount by supplying substantially said certain hydraulic pressure value both to said first pressure chamber and also to said second pressure chamber.

5. An idling control system according to claim 1 or claim 2, said vehicle comprising a manually operated anti creep selection switch, wherein said third means thus starts the actuation of said first means to engage said forward clutch to said intermediate amount and of said second means to engage said brake, only if anti creep control is selected on said manually operated anti creep selection switch.

6. An idling control system according to claim 1 or claim 2, said vehicle comprising a manually operated transmission shift mode selection switch, wherein said third means thus starts the actuation of said first means to engage said forward clutch to said intermediate amount and of said second means to engage said brake, only if economy driving mode is selected on said manually operated transmission shift mode selection switch.

* * * * *